Nov. 2, 1965  E. K. HANSEN  3,215,408
BULK MATERIAL BLENDING AND UNLOADING VEHICLE
Filed April 22, 1963  3 Sheets-Sheet 1

INVENTOR
ELMER K. HANSEN
BY
*Rudolph L. Lowell*
ATTORNEY

Nov. 2, 1965  E. K. HANSEN  3,215,408
BULK MATERIAL BLENDING AND UNLOADING VEHICLE
Filed April 22, 1963  3 Sheets-Sheet 2
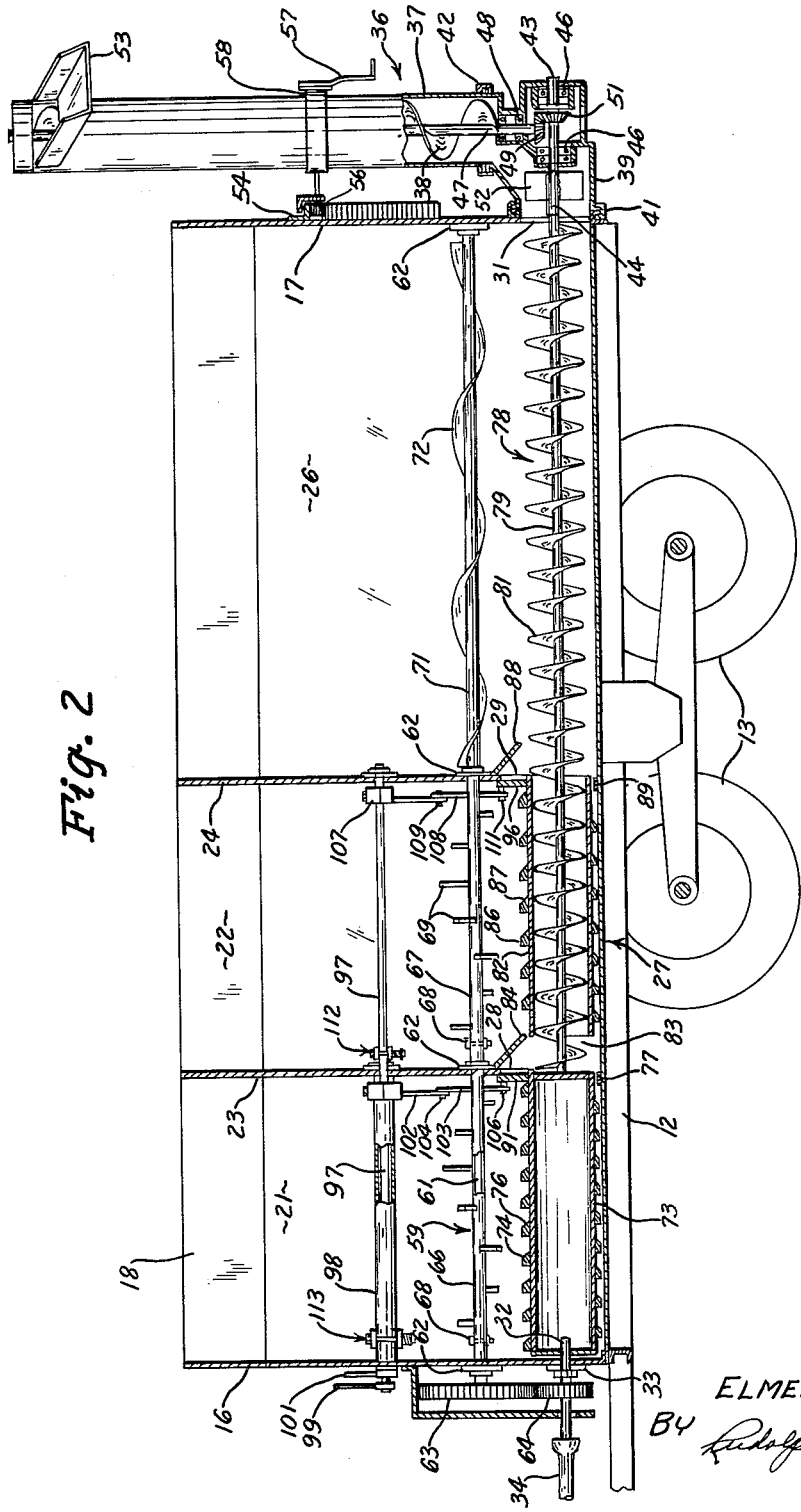
Fig. 2
INVENTOR
ELMER K. HANSEN
BY 
ATTORNEY Nov. 2, 1965 E. K. HANSEN 3,215,408
BULK MATERIAL BLENDING AND UNLOADING VEHICLE
Filed April 22, 1963 3 Sheets-Sheet 3
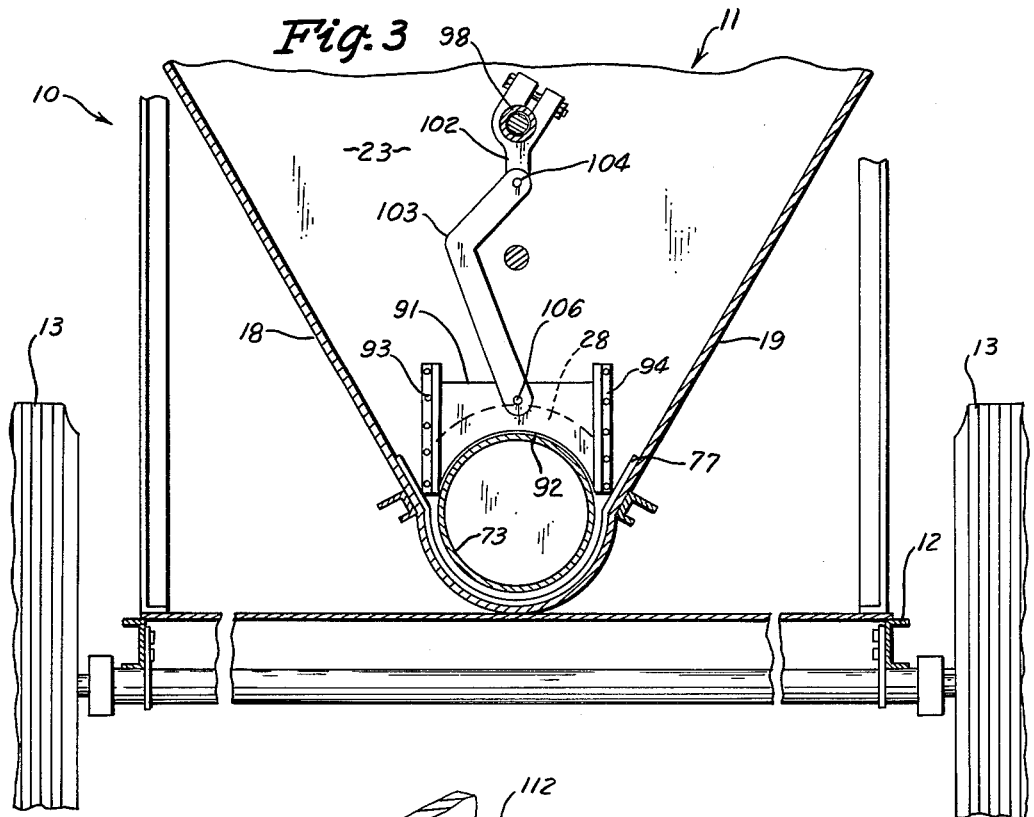
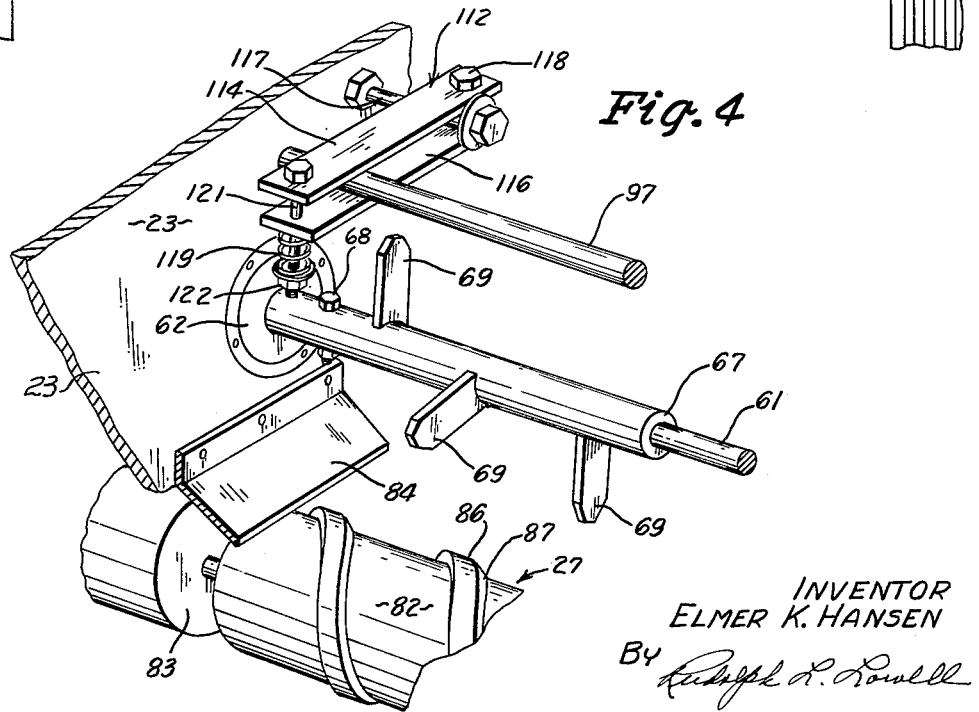
INVENTOR
ELMER K. HANSEN
BY
ATTORNEY

United States Patent Office 3,215,408
Patented Nov. 2, 1965

3,215,408
BULK MATERIAL BLENDING AND
UNLOADING VEHICLE
Elmer K. Hansen, 126 Cecilia, Sioux City, Iowa
Filed Apr. 22, 1963, Ser. No. 274,566
8 Claims. (Cl. 259—9)

This invention relates to a bulk material handling apparatus and more particularly to a bulk material blending and unloading vehicle having a material carrying box divided into a plurality of bins and a rotary conveyor positioned in the box and operable to remove the bulk material from the bins.

It is the object of the present invention to provide an improved bulk material handling vehicle wherein bulk material is metered from at least one material holding bin into a primary material holding bin and wherein the material is blended and moved into a discharge means by a power driven rotary conveyor positioned longitudinally in the bins.

Another object of the invention is to provide a bulk material blending and unloading vehicle which is continuous in operation to blend, in varying ratios, a plurality of bulk materials separately carried by the vehicle and to completely unload the blended material from the vehicle.

A further object of the invention is to provide in a bulk material blending and unloading vehicle, a power driven rotary conveyer which does not compress the bulk material which it moves longitudinally of the vehicle.

Still another object of the invention is to provide a bulk material blending and unloading vehicle which is operable to mix two or more separate supplemental bulk materials in varying ratios with a primary bulk material and to discharge the mixed material from the vehicle.

An additional object of the invention is to provide an improved, bulk material blending and unloading vehicle which is economical and rugged in construction, versatile, reliable and efficient in use.

The exact nature of the invention as well as other objects and advantages thereof will be readily apparent from a consideration of the following specification relating to the annexed drawing in which:

FIG. 2 is an enlarged longitudinal sectional view taken along the line 2—2 of FIG. 1;

FIG. 3 is an enlarged transverse sectional view taken along the line 3—3 of FIG. 1; and FIG. 4 is a fragmentary detail perspective view showing a friction brake for a material metering door and a trap cover for the rotary conveyor.

Figure 1:
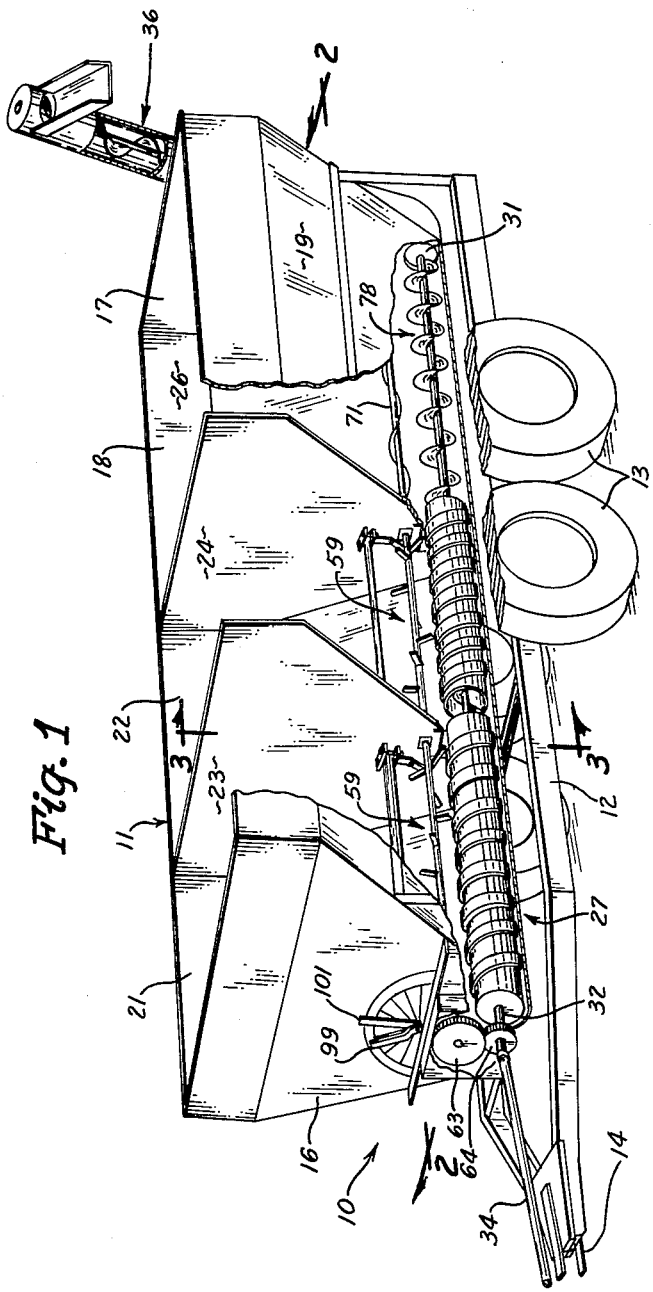
FIG. 1 is a perspective view of the bulk material handling vehicle of the present invention with parts broken away to illustrate the rotary blending and discharge conveyer.

Referring to the drawing, there is shown in FIG. 1 the bulk material blending and unloading vehicle of this invention, indicated generally at 10 and illustrated as a feed handling wagon having a bulk material body or box 11 of a flare-type supported on a portable frame 12 mounted on a pair of tandem ground wheels 13. The front end of the frame 12 is secured to a tongue 14 which is adapted to be attached to a power driven vehicle such as a tractor.

The box 11 has longitudinally spaced and parallel front and rear end walls 16 and 17 which are secured to downwardly converging side walls 18 and 19. The forward section of the box 11 is divided into a pair of secondary bins 21 and 22 by two parallel and longitudinally spaced transverse walls or partitions 23 and 24. The end wall 17 and transverse wall 24 define a primary bulk material bin 26.

The bulk material in the secondary bins 21 and 22 and the primary bin 26 is removed from the body 11 by a rotary conveyer 27 which is positioned in the lower or apex portion of the body 11 and projects through axially aligned openings 28, 29, and 31 in the transverse walls 23 and 24 and end wall 17, respectively. The forward end of the rotary conveyer 27 is connected to a shaft 32 which extends through the front end wall 16 in axial alignment with the rotary conveyer 27 and is mounted thereon by a bearing 33 (FIG. 2). The shaft 32 is connected to a tractor or other power driven vehicle by a power take-off drive shaft 34 having suitable universal joints (not shown).

The rotary conveyer 27, operated by the rotation of the power take-off shaft 34, removes the bulk material from the secondary bins 21 and 22 into the primary bin 26 where it is mixed or blended with the material therein and simultaneously moved toward the rear end wall 17 and through the opening 31 into a material discharge means 36 which carries the blended bulk material upward and laterally of the vehicle 10 for discharge to a desired location. The details of the material discharge means 36 form the subject matter disclosed in applicant's U.S. Patent No. 2,839,208, issued June 17, 1958.

As shown in FIG. 2, the material discharge means 36 comprises a tubular conveyer member 37 containing an elevator auger 38. An elbow housing 39, rotatably mounted on the end wall 17 by means of a split connector ring 41, is connected to the lower end of the conveyer member 37 through a split connector ring 42 which permits the conveyer member 37 to rotate about the axis of the auger 38. A shaft 43 is drivably connected to the end of the rotary conveyer 27 by a male and female coupling 44 that is rotatably mounted in axial alignment with the rotary conveyer 27 in the elbow housing 39 by bearings 46. The drive shaft 47 for the auger 38 is supported in the elbow housing 39 by bearings 48 in transverse alignment with the shaft 43. A pair of bevel gears 49 and 51 connected to the shafts 47 and 43 respectively are in driving engagement thereby effecting a driving connection between the rotary conveyer 27 and the auger 38.

In order to insure the proper feeding of the discharge bulk material from the opening 31 in the end wall 17 to the auger 38, an impeller 52 is drivably connected to the shaft 43 adjacent the coupling 44. The impeller 52 rotates continuously to move the mixed bulk material through the elbow housing 39 into the path of movement of the auger 38. The bulk material is carried by the auger 38 upward to a spout 53 secured to the outer end of the tubular conveyer member 37.

The angular position of the material discharge means 36 with respect to the box 11 is controlled by an arcuate rack 54 fastened to the rear wall 17 and a pinion 56 cooperating with the rack 54. The pinion 56 is rotated by a crank assembly 57 which is mounted on the tubular conveyer member 37 for movement axially thereof by means of a sleeve 58. The crank assembly 57 is manually operated and functions to rotate the pinion 56 on the arcuate rack 54 thereby rotating the material discharge means 36 about the axis of the rotary conveyer 27 enabling the discharge means to deposite bulk material laterally on each side of the vehicle.

The bulk material in the bins 21, 22 and 26 above the rotary conveyer 27 is prevented from packing by an agitator 59 which extends longitudinally of the box 11 above the rotary conveyer 27. The agitator 59 comprises an elongated shaft 61 which extends through the end walls 16 and the transverse walls 23 and 24 and is rotatably mounted on the respective walls by means of bearings 62. The forward end of the shaft 61 extends through the front wall 16 and is secured to a driven gear 63 which is in driving engagement with a drive gear 64 mounted on the shaft 32. Positioned concentrically over the section of the shaft 61 which extends through the secondary bins 21 and 22 are sleeves 66 and 67 having a cylindrical cross section. Bolts 68 extended diametrically through the sleeves 66 and 67 and the shaft 61 positively connect the sleeves 66 and 67 with the shaft 61. Projected radially outward from the sleeves 66 and 67 are a plurality of arms 69. The arms 69 are longitudinally separated from each other along the length of the sleeves 66 and 67 and are angularly spaced with respect to each other about the circumference of the sleeves forming a spiral pattern.

Positioned concentrically of and secured to that section of the shaft 61 which extends into the primary bin 26 is an agitating auger 71 having a spiral flight 72 with a relatively long pitch. The direction of rotation of the agitator 59 and the auger 71 thereof is opposite to the direction of rotation of the rotary conveyer 27 because of the direct drive between the gears 63 and 64. The arms 69 of the agitator in the secondary bins 21 and 22 rotate in a circular path and the agitator auger 71 in the primary bin 26 rotates in an effective spiral path so as to move the bulk material in the bin 26 toward the transverse wall 24. This movement is opposed to the bulk material moved by the rotary conveyer 27.

As shown in FIG. 2, the rotary conveyer 27 comprises a first cylindrical section 73 extended longitudinally along the bottom of the bin 21 and through the hole 28 in the transverse wall 23. The shaft 32 is drivably connected to the forward end of the first cylindrical section to rotate it in a circular path. A continuous relatively flat ribbon 74 helically extends around the outer peripheral surface of the first cylindrical section 73 and is secured thereto. The leading side wall 76 of the ribbon 74 is tapered rearwardly and outwardly and forms an obtuse angle with the peripheral surface of the cylindrical section 73. The taper of the leading side wall 76 minimizes the tendency of the bulk material to pack between the spaces of consecutive ribbon sections. As best illustrated in FIG. 3, a strap 77 extends around and is secured to the apex section of the side walls 18 and 19 under the cylindrical section 73 thereby minimizing the space between the side walls 18 and 19 and the end of the cylindrical section 73. The strap 77 restricts the space between the cylindrical section 73 and the walls 18 and 19 resulting from the ribbon 74 secured to the cylindrical section 73.

Secured in axial alignment with the first cylindrical section 73 is an auger 78 having a central drive shaft 79 and a continuous spiral flight 81. The terminal end of the drive shaft 79 for the auger 78 is connected to the male and female coupling 44 for transmitting power to the material discharge means 36. Positioned concentrically over and secured to the peripheral portion of the flight of the auger 78 in the secondary bin 22 is a cylindrical sleeve member 82 which extends through the opening 29 in the transverse wall 24. The sleeve member 82 is spaced rearwardly of the terminal end of the cylindrical section 73 so that the bulk material moved by the cylindrical section 73 flows down into the auger 78 and is moved longitudinally rearward by the flight 81 thereof.

In order to prevent the bulk material in the secondary bin 22 from entering the space 83 (FIGS. 2 and 4) between the sleeve member 82 and the cylindrical section 73 a sloping cover 84 is secured to the transverse wall 23 above the opening 28 therein. The cover 84 extends downwardly and rearwardly and terminates adjacent the forward end of the sleeve member 82.

The bulk material in the secondary bin 22 is moved rearwardly by a continuous flat ribbon 86 helically wound around the sleeve member 82 and secured to the peripheral surface thereof. The leading side wall 87 of the ribbon 86 is tapered rearwardly and radially inwardly to form an obtuse angle with the peripheral surface of the sleeve member 82. The taper of the leading wall 87 of the ribbon 86 functions to minimize the packing of bulk material between the consecutive sections of the flat ribbon 86 thereby providing a continuous flow of bulk material through the opening 29 in the transverse wall 24. A cover 88 secured to the transverse wall 24 adjacent the opening 29 therein extends over a portion of the auger 78 and provides a space into which the bulk material moved by the sleeve member 82 is received and mixed or blended with the bulk material in the bin 26 carried by the auger 78. A strap 89, similar to the strap 77, is secured to the side walls 18 and 19 and extends around the apex section thereof under the sleeve member 82 to minimize the space between the sleeve member 82 and the side walls 18 and 19.

The blend ratio of the bulk material in each of the secondary bins 21 and 22 may be varied with respect to the bulk material in the primary bin 26 from about 3½ to 1 to 40 to 1. This variation in the blend ratio is achieved by regulating the size of the openings 28 and 29 in the transverse walls 23 and 24.

As shown in FIG. 3, the opening 28 is covered by a gate 91 having an arcuate bottom edge 92 which conforms to the curvature of the cylindrical section 73. When the gate 91 is in its closed position it is spaced slightly above the peripheral surface of the cylindrical section 73 thereby preventing the bulk material from being packed against the wall 23. The gate 91 is slidably mounted on the transverse wall 23 by means of upright guides 93 and 94 which retain the gate 91 adjacent the wall 23. The opening 29 in the transverse wall 24 is closed by a gate 96 which is similar to the gate 91.

The position of the gates 91 and 96 is controlled by a crank assembly which comprises an elongated shaft 97 rotatably mounted longitudinally of the box 11 in the front wall 16 and the transverse walls 23 and 24. A second shaft 98 is positioned concentrically over the section of the first shaft 97 which extends through the bin 21 and is freely rotatable thereon. Separate control levers 99 and 101 are mounted on the ends of the respective shafts 97 and 98 which extend through the front wall 16. As shown in FIG. 3 an arm 102 is clamped on the shaft 98 directly above the gate 91. An L-shaped link 103 is pivotally mounted to the outer end of the arm 102 by a bolt 104 and to the center section of the gate 91 by bolt 106. Angular movement of the lever 101 will rotate the shaft 98 thereby moving the arm 102 in an arcuate path and raise the L-shaped link 103 together with the gate 91.

An arm 107 clamped around the shaft 97 above the gate 96 is connected thereto by means of an L-shaped link 108 and bolts 109 and 111. Angular movement of the control lever 99 rotates the shaft 97 thereby moving the arm 107 in an arcuate path raising the link 108 with the gate 96 to effect an opening of the passage between the bins 22 and 26.

In order to hold the gates in a desired position each shaft 97 and 98 is provided with a friction brake 112 and 113 which are mounted on the walls 23 and 16, respectively. The brakes 112 and 113 are identical in construction. The following description will be limited to the brake 112 which is shown in FIG. 4.

The brake 112 is a continuous friction brake comprising a pair of flat plates 114 and 116 extended over the top and bottom sides of a stud 117 extended rearwardly from the wall 23 parallel to the shaft 97. A bolt 118 connects the ends of the plates 114 and 116 adjacent the stud 117. The plates 114 and 116 are frictionally engaged to both sections of the shaft 97 and are continuously biased thereagainst by a compression spring 119 which is positioned around a bolt 121 extended through the plates 114 and 116 at a position adjacent the shaft 97. By adjusting a nut 122 for the bolt 121 the biasing force of the compression spring 119 may be varied to in turn vary the braking action of the plates 114 and 116 on the shaft 97.

In use, the tongue 14 of the bulk material blending and unloading vehicle 10 is connected to the draw bar of a tractor (not shown) and the power shaft 34 is connected to the power take-off of the tractor. With the desired bulk material in the primary bin 26 and the secondary bins 21 and 22 the vehicle 10 is transported to the place where the blended bulk material is to be deposited. The material discharge means 36 is positioned for manually operating the crank assembly 57 to unload the bulk material in a specific location.

The control levers 99 and 101 are angularly moved to open the gates 91 and 96 for metering the desired amount of bulk material from the bins 21 and 22 into the auger 78. After the control levers 99 and 101 have been moved to a preselected position the rotary conveyer 27 may be operated to automatically blend and unload bulk material from the box 11 of the vehicle. The shaft 32 directly connects the rotary conveyer 27 with the power shaft 34 so that the rotary conveyer 27 rotates at the same speed of rotation as the power shaft 34. The cylindrical section 73 and its helical ribbon 74 rotate and move the bulk material in the bin 21 through the opening 28 and into the space 83 below the cover 84 as shown in FIGS. 2 and 4.

From the space 83 the bulk material moves into the forward section of the auger 78 and is carried by the flight 81 thereof through the cylindrical sleeve member 82 into the primary bin 26. The bulk material in the secondary bin 22 is moved by the sleeve member 82 and its helical ribbon through the opening 29 in the wall 24 and into the conveyer 78 where it is mixed with the material from the bin 21 and the bulk material in the primary bin 26. The cover 88 over the opening 29 prevents the material in the bin 26 from closing the opening 29 thereby preventing the bulk material in the bin 22 from flowing into the auger 78.

The auger 78 carries the material longitudinally of the bin 26 and discharges it through the opening 31 in the rear end wall 17. The rotating impeller 52, at the opening 31, kicks or moves the material upwardly and rearwardly into the path of the elevator auger 38 which carries the material upwardly to the spout 53 for discharge of the blended bulk material to a desired position.

In order to insure even and continuous flow of bulk material in the respective bins toward the rotary conveyer the agitator 59 is positioned slightly above and longitudinally of the rotary conveyer 27. The agitator 59 is driven by gears 63 and 64 in a direction which is opposite to the rotary movement of the conveyer 27. The agitator in the primary bin 26 is an auger having a relatively long pitch and functions to move the bulk material toward the transverse wall 24 thereby effecting a leveling action of the bulk material in the bin 26. The teeth 69 on the agitator section in the bins 21 and 22 dig into the bulk material and prevent the packing thereof enabling a uniform flow of material to the rotary conveyer 27.

The blend ratio of the bulk material in the bins 21 and 22 may be separately controlled by changing the position of the gate 91 or 96. Each gate is independently operable to either increase or decrease the blend of ratio of its associated bin without affecting the blend ratio of the other bin.

In summary, the bulk material blending and unloading vehicle 10 has a material carrying box 11 which is divided into a plurality of bins adapted to hold bulk materials. A rotary conveyer 27 is mounted along the bottom of the bins and operates to remove and blend the bulk materials from the separate bins to a material discharge means 36.

Although the invention has been described with respect to a preferred embodiment thereof, it is to be understood that it will not be so limited and changes can be made therein which are within the scope of the appended claims.

I claim:

1. A bulk material handling vehicle having a portable frame comprising:

(a) a body mounted on said frame and having side walls, end walls, and a pair of longitudinally spaced transverse walls dividing the body into a primary bin and first and second secondary bins, one of said end walls and said transverse walls having axially aligned openings adjacent the bottom of said body, (b) an elongated driven rotary conveyer means positioned longitudinally of said body within said bins and extended through said openings in the transverse walls and one end wall and operative to separately move bulk material from the first and second secondary bins into the primary bin and to blend said separately moved bulk materials with a bulk material in the primary bin, (c) means for each of the openings in said transverse walls for regulating the flow of material therethrough, and (d) material discharge means mounted on said one end wall for receiving the blended bulk material from the rotary conveyer.

2. A bulk material handling vehicle having a portable frame comprising:

(a) a body mounted on said frame and having side walls, end walls, and a pair of longitudinally spaced transverse walls dividing the body into a primary bin and first and second secondary bins, one of said end walls and said transverse walls having axially aligned openings adjacent the bottom of said body, (b) an elongated driven rotary conveyer positioned longitudinally of said body within and adjacent the bottom of said bins, said conveyer extended through said openings in the transverse walls and one end wall and operative to separately move bulk material from the first and second secondary bins into the primary bin and blend separately moved said bulk material with the bulk material in the primary bin, including (c) cylindrical means positioned in the first secondary bin and having on its outer peripheral surface means for moving the bulk material from the first secondary bin into the second secondary bin through the opening in a first one of said dividing walls, (d) auger means connected to said cylindrical means in axial alignment therewith, said auger means positioned in and extended longitudinally of said primary bin and second secondary bin, (e) sleeve means concentric with and secured to the section of the auger means in said second secondary bin, said sleeve means being axially spaced from said cylindrical means whereby the bulk material moved by said cylindrical means is discharged through the opening in said first dividing wall into the auger means and carried thereby within said sleeve means into said primary bin, (f) means on the outer peripheral surface of said sleeve means for moving bulk material from the second secondary bin into the primary bin through the opening in the second one of said dividing walls, (g) means for each of the openings in said dividing walls for regulating the flow of material therethrough, and (h) material discharge means mounted on said one end wall for receiving the blended bulk material from the rotary conveyer.

3. The bulk material handling vehicle defined in claim 2 wherein the means on the outer peripheral surfaces of the cylindrical means and sleeve means comprises:

(a) elongated body means secured to and helically wound around the outer peripheral surface of said cylindrical means and sleeve means.

4. A bulk material handling vehicle comprising:

(a) a hollow body having end walls and a transverse wall dividing the body into first and second bulk material holding bins, (b) an elongated driven rotary conveyer including a cylindrical section positioned longitudinally in said first bin adjacent the bottom thereof, said cylindrical section having material moving means on the peripheral surface thereof for moving said material from said first bin into the second bin, and auger means connected to said cylindrical section in axial alignment therewith and positioned longitudinally in said second bin adjacent the bottom thereof to receive the bulk material from said first bin to mix said bulk material with the bulk material in the second bin and to move the mixed bulk material toward one end wall of the vehicle, (c) metering means connected to said transverse wall adjacent said rotary conveyor for varying the amount of bulk material moved from the first bin into the second bin, and (d) means rotatably mounting the rotary conveyer on the end walls.

5. The bulk material handling vehicle defined in claim 4 wherein the material moving means of said cylindrical section comprises:

(a) body means secured to and helically wound around the outer peripheral surface of said cylindrical section.

6. A rotary conveyer for a bulk material handling apparatus having a box divided into a first and second bulk material holding bins comprising:

(a) cylindrical means positioned longitudinally of said first bin adjacent the body thereof, said cylindrical means having an outer peripheral surface provided with means for moving the bulk material axially thereof for discharge into the second bin, (b) auger means positioned longitudinally of said second bin adjacent the bottom thereof and secured to said cylindrical means in axial alignment therewith, said auger means operable to receive the material discharged by said cylindrical means to blend the material from said first bin with material in said second bin, and to discharge the blended material from said second bin, (c) metering means on said box for varying the amount of material discharged by said cylindrical means into said second bin.

7. A rotary conveyer for a bulk material handling apparatus having a box divided into first, second and third material holding bins comprising:

(a) first cylindrical means in said first bin, having an outer peripheral surface provided with means for moving the bulk material from the first bin to the second bin, (b) auger means in said second and third bins secured to said first cylindrical means in axial alignment therewith, and (c) second cylindrical means concentric with and secured to the section of the auger means in said second bin, said second cylindrical means being axially spaced from said first cylindrical means whereby the bulk material moved by said first cylindrical means is discharged into the section of the auger means in the second bin and carried thereby within said second cylindrical means into the third bin, said second cylindrical means having an outer peripheral surface provided with means for moving the bulk material from the second bin into the section of the auger means in the third bin, said auger means in the third bin acting to blend the material from the first and second bins with the material in the third bin, and to discharge the blended material from the third bin.

8. The rotary conveyer defined in claim 7 wherein the means on the outer peripheral surface of the first and second cylindrical means comprises:

(a) ribbon means secured to and helically wound around the outer peripheral surfaces of said first and second cylindrical means, said ribbon means having a leading side wall which tapers rearwardly and inwardly to form an obtuse angle with the peripheral surface of the respective cylindrical means.

References Cited by the Examiner
UNITED STATES PATENTS

| | | | |
|---|---|---|---|
| 1,563,101 | 11/25 | Offenhauser | 259—97 |
| 2,813,704 | 11/57 | MacKissic | 259—9 |
| 2,872,166 | 2/59 | Roberts | 259—9 |

CHARLES A. WILLMUTH, *Primary Examiner.*